(12) United States Patent
Zuniga et al.

(10) Patent No.: US 9,712,294 B2
(45) Date of Patent: *Jul. 18, 2017

(54) METHOD FOR PERFORMING WIRELESS SWITCHING

(71) Applicant: InterDigital Technology Corporation, Wilmington, DE (US)

(72) Inventors: Juan Carlos Zuniga, Montreal (CA); Teresa J. Hunkeler, Halifax (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,456

(22) Filed: Nov. 12, 2014

(65) Prior Publication Data

US 2015/0071243 A1    Mar. 12, 2015

Related U.S. Application Data

(63) Continuation of application No. 13/113,713, filed on May 23, 2011, now Pat. No. 8,917,660, which is a
(Continued)

(51) Int. Cl.
*H04L 5/00* (2006.01)
*H04W 72/04* (2009.01)
(Continued)

(52) U.S. Cl.
CPC .......... *H04L 5/0023* (2013.01); *H04W 72/04* (2013.01); *H04W 72/042* (2013.01);
(Continued)

(58) Field of Classification Search
None
See application file for complete search history.

(56) References Cited

U.S. PATENT DOCUMENTS 5,463,400 A    10/1995   Tayloe
5,726,978 A    3/1998    Frodigh et al.
(Continued)

FOREIGN PATENT DOCUMENTS

EP    1263168        12/2002
JP    2001-298436    10/2001
(Continued)

OTHER PUBLICATIONS

Berezdivin et al. "Next Generation Wireless Communications Concepts and Technologies," IEEE, pp. 108-116, (Mar. 2002).
(Continued)

*Primary Examiner* — Gregory Sefcheck
(74) *Attorney, Agent, or Firm* — Volpe and Koenig, P.C.

(57) ABSTRACT

A wireless communication system includes an infrastructure device for transmitting and receiving communications to and from a plurality of wireless user terminals. Each wireless user terminal includes a receiver and a controller that receives a plurality of orthogonal frequency division multiplexing (OFDM) signals on a first carrier frequency of a downlink. Each of the plurality of OFDM signals includes carrier frequency assignment information indicating a carrier frequency to transmit uplink data and spatial pattern information indicating a spatial pattern. In response to the carrier frequency assignment information of each of the plurality of OFDM signals, a transmitter and the controller of the wireless user terminal transmit a plurality of uplink signals. Each of the plurality of uplink signals are transmitted on the indicated carrier frequency and using the indicated spatial pattern.

17 Claims, 2 Drawing Sheets

Related U.S. Application Data continuation of application No. 10/334,858, filed on Dec. 31, 2002, now abandoned.

(60) Provisional application No. 60/394,151, filed on Jul. 5, 2002.

(51) Int. Cl.
| | |
|---|---|
| *H04W 4/06* | (2009.01) |
| *H04W 16/14* | (2009.01) |
| *H04W 72/08* | (2009.01) |
| *H04W 84/12* | (2009.01) |
| *H04W 88/08* | (2009.01) |
| *H04W 88/02* | (2009.01) |

(52) U.S. Cl.
CPC .......... *H04W 72/0453* (2013.01); *H04W 4/06* (2013.01); *H04W 16/14* (2013.01); *H04W 72/046* (2013.01); *H04W 72/08* (2013.01); *H04W 84/12* (2013.01); *H04W 88/02* (2013.01); *H04W 88/08* (2013.01)

(56) References Cited

U.S. PATENT DOCUMENTS

| | | | |
|---|---|---|---|
| 5,781,536 A | 7/1998 | Ahmadi et al. | |
| 5,933,420 A | 8/1999 | Jaszewski et al. | |
| 6,052,594 A | 4/2000 | Chuang et al. | |
| 6,144,340 A | 11/2000 | Kliski et al. | |
| 6,144,711 A * | 11/2000 | Raleigh ................ | H04B 7/0615 375/346 |
| 6,215,982 B1 | 4/2001 | Trompower | |
| 6,259,898 B1 | 7/2001 | Lewis | |
| 6,345,043 B1 | 2/2002 | Hsu | |
| 6,393,261 B1 | 5/2002 | Lewis | |
| 6,452,981 B1 * | 9/2002 | Raleigh ................ | H04B 7/0615 375/296 |
| 6,611,231 B2 * | 8/2003 | Crilly, Jr. ............. | G01S 13/74 342/378 |
| 6,647,015 B2 | 11/2003 | Malkemes et al. | |
| 6,721,569 B1 | 4/2004 | Hashem et al. | |
| 6,813,254 B1 | 11/2004 | Mujtaba | |
| 6,859,450 B1 | 2/2005 | Mansfield | |
| 6,888,899 B2 * | 5/2005 | Raleigh ................ | H04B 7/0615 375/296 |
| 6,904,283 B2 | 6/2005 | Li et al. | |
| 6,940,827 B2 | 9/2005 | Li et al. | |
| 6,967,937 B1 | 11/2005 | Gormley | |
| 7,020,110 B2 | 3/2006 | Walton et al. | |
| 7,072,315 B1 | 7/2006 | Liu et al. | |
| 7,075,967 B2 | 7/2006 | Struhsaker et al. | |
| 7,110,349 B2 * | 9/2006 | Branlund ........... | H04B 1/71052 370/203 |
| 7,133,380 B1 | 11/2006 | Winters et al. | |
| 7,206,586 B2 | 4/2007 | Kim et al. | |
| 7,230,931 B2 | 6/2007 | Struhsaker | |
| 7,289,467 B2 | 10/2007 | Bourlas et al. | |
| 7,304,939 B2 | 12/2007 | Steer et al. | |
| 7,346,357 B1 | 3/2008 | Kim et al. | |
| 7,414,964 B2 | 8/2008 | Hashem et al. | |
| 7,573,891 B1 | 8/2009 | Chow et al. | |
| 7,636,573 B2 | 12/2009 | Walton et al. | |
| 7,852,812 B2 | 12/2010 | Li et al. | |
| 8,036,164 B1 | 10/2011 | Winters et al. | |
| 8,040,855 B2 | 10/2011 | Li et al. | |
| 8,094,625 B2 | 1/2012 | Walton et al. | |
| 2001/0022805 A1 | 9/2001 | Dabak et al. | |
| 2001/0030988 A1 | 10/2001 | Fry | |
| 2002/0021684 A1 | 2/2002 | Toshimitsu et al. | |
| 2003/0067901 A1 | 4/2003 | Schein et al. | |
| 2003/0156570 A1 | 8/2003 | Alamouti et al. | |
| 2007/0030886 A1 | 2/2007 | Doi | |

FOREIGN PATENT DOCUMENTS

| | | |
|---|---|---|
| JP | 2002-084221 | 3/2002 |
| JP | 2003-052079 | 2/2003 |
| KR | 2001-0090038 | 10/2001 |
| WO | 98/12833 | 3/1998 |
| WO | 99/21310 | 4/1999 |
| WO | 99/56416 | 11/1999 |
| WO | 00/64006 | 10/2000 |
| WO | 02/11348 | 2/2002 |
| WO | 02/28121 | 4/2002 |
| WO | 02/37754 | 5/2002 |

OTHER PUBLICATIONS

Ko et al., "Medium Access Control Protocols Using Directional Antennas in Ad Hoc Networks." InfoCom 2000. Nineteenth Annual Joint Conference of the IEEE Computer and Communications Societies. Proceedings, IEEE Tel Aviv, Israel, Mar. 26-30, 2000, vol. 1, Mar. 26, 2000. pp. 13-21.

Muta et al., "Adaptive Channel Selection in Frequency-selective Fading Environment," IEEE International Conference on Communications, vol. 3, pp. 1846-1851 (1999).

Muta et al., "Adaptive Channel Selection in Frequency-selective Fading Environment," IEICE Transactions on Communications, vol. J82-B, No. 5, pp. 991-1000, (May 1999). (In Japanese).

Myles et al. "IEEE 802.11h Potential Draft Text D2.0" IEEE P802.11 Wireless LANs, Mar. 2002, pp. i-67.

* cited by examiner

METHOD FOR PERFORMING WIRELESS SWITCHING

CROSS REFERENCE TO RELATED APPLICATION

This application is a continuation of U.S. patent application Ser. No. 13/113,713 filed May 23, 2011, now U.S. Pat. No. 8,917,660, which is a continuation of U.S. patent application Ser. No. 10/334,858 filed Dec. 31, 2002, now abandoned, which claims the benefit of U.S. Provisional Application No. 60/394,151, filed on Jul. 5, 2002, which is incorporated by reference as if fully set forth.

FIELD OF INVENTION

The present invention relates to a Wireless LAN system (WLAN) with several users connected. More particularly, switching of WLAN systems for avoiding collisions.

BACKGROUND

WLAN systems make use of the unlicensed bands for wireless communication. Transmissions of a wireless LAN (WLAN) communication system may be from a particular terminal to a desired destination, either another terminal within the same Basic Service System (BSS) or the backbone network, but always within the same carrier. There are two modes of operation for WLAN systems: ad-hoc and infrastructure. In the ad-hoc mode, terminals can talk to each other in a multipoint-to-multipoint fashion. In the infrastructure mode, an access point (AP) acts as a base station to control the transmissions among users, thus providing a point-to-multipoint wireless network. Since all the users share the same medium in a WLAN, the infrastructure mode becomes more efficient for semi-heavy to heavy loaded networks.

In an infrastructure mode, the terminal first communicates with the AP when sending data to a desired destination terminal. The AP in turn bridges or routes the information to the desired destination. Thus, in this mode, an AP of a WLAN communication system controls the transmissions within a BSS or cell.

Medium Access Control (MAC) protocols are defined to coordinate the channel usage for WLAN users sharing the band. These MAC protocols are based upon avoiding collisions between users as several users access the channel at the same time. The efficiency of a protocol is gauged by successful avoidance of collisions.

Two protocols used by WLAN are CSMA/CA MAC and CSMA/CD Ethernet protocol. Both protocols can sense the carrier for other transmissions. An Ethernet can be connected in various manners, including Ethernet hubs and Ethernet switches. An Ethernet hub concentrates the connections in a central point as a point-to-multipoint connection, with no impact on performance. An Ethernet switch operates every time that there is a packet arrival from a terminal. The switch reads the destination address, learns on which port it is connected and makes a direct connection between the two physical ports. The advantage of the Ethernet switch is that the MAC does not sense any other user in the medium, which improves performance through reduced probability of collisions and enhanced throughput as compared to an Ethernet hub. An Ethernet hub forwards a received packet to all users, even when there is only one intended receiver. The hub does not look at address information. The Ethernet switch only sends the packet directly to the intended destination, resulting in a more efficient usage of the available bandwidth.

A common WLAN AP is not capable of using more than one carrier frequency at the same time, which results in low protocol efficiency. Ethernet switches have proven to improve the efficiency of the Ethernet protocol considerably.

Therefore, what is needed is a method for improving the performance of a wireless point-to-multipoint network when the terminals share the same medium.

SUMMARY

A wireless communication system includes an infrastructure device for transmitting and receiving communications to and from a plurality of wireless user terminals. Each wireless user terminal includes a receiver and a controller that receives a plurality of orthogonal frequency division multiplexing (OFDM) signals on a first carrier frequency of a downlink. Each of the plurality of OFDM signals includes carrier frequency assignment information indicating a carrier frequency to transmit uplink data and spatial pattern information indicating a spatial pattern. In response to the carrier frequency assignment information of each of the plurality of OFDM signals, a transmitter and the controller of the wireless user terminal transmit a plurality of uplink signals. Each of the plurality of uplink signals are transmitted on the indicated carrier frequency and using the indicated spatial pattern.

BRIEF DESCRIPTION OF THE DRAWING(S)

DESCRIPTION OF THE PREFERRED EMBODIMENTS

Figure 1A:
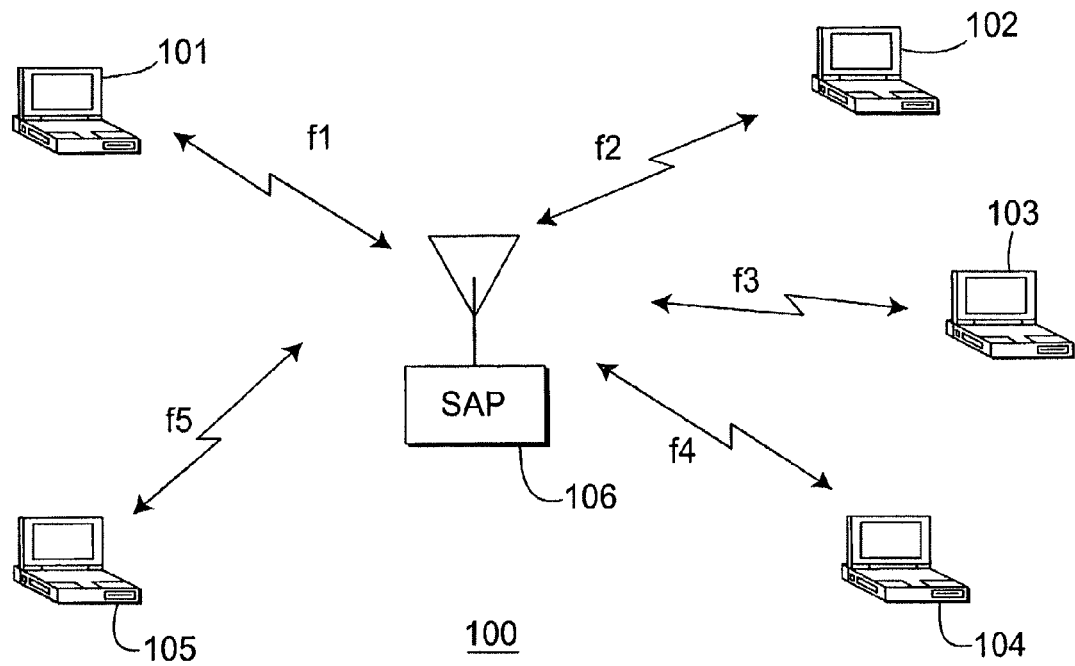
FIG. 1A shows a system diagram of a WLAN with frequency carrier Ethernet ports.

FIG. 1A shows a system that applies the Ethernet switch principle to an access point (AP), allowing multi-frequency operation, so that the AP becomes a Switching Access Point (SAP) 106. Frequency carriers f1-f5 are treated as different ports in the SAP, from which user terminals 101-105 have centralized access to frequency carriers f1-f5 in a controlled manner.

As shown in FIG. 1A, each user terminal 101-105 is assigned to a frequency carrier f1-f5 and SAP 106 is capable of receiving and transmitting each carrier f1-f5. In order to avoid permanent assignment of carriers f1-f5 to each user terminal 101-105, two approaches may be used. In the preferred embodiment, it is desirable, although not essential, to not permanently assign carriers to user terminals 101-105. A non-permanent assignment avoids assigning a frequency to a terminal not sending data. When there are more terminals than available frequencies, a terminal that has data to send can be prevented from doing so if the terminal permanently assigned to a frequency is not using it.

A dynamic carrier assignation (DCA) scheme can be applied, in which user terminals 101-105 send a request-tosend (RTS) in a shared carrier and then the SAP replies with a clear-to-send (CTS) indicating the carrier that can be used for the transmission.

Alternatively, a frequency hopping scheme may be used, in which user terminals 101-105 have a pseudo-random sequence for changing carriers, known a priori by user terminals 101-105 and SAP 106, to minimize the probability of two user terminals simultaneously using the same carrier. For a preferred WLAN developed according to the current 802.11b standard, three carriers are used for frequency hopping. For the 802.11a standard, eight carriers are used for frequency hopping. Wireless switching system 100 may employ DCA and frequency hopping either separately or combined.

Figure 1B:
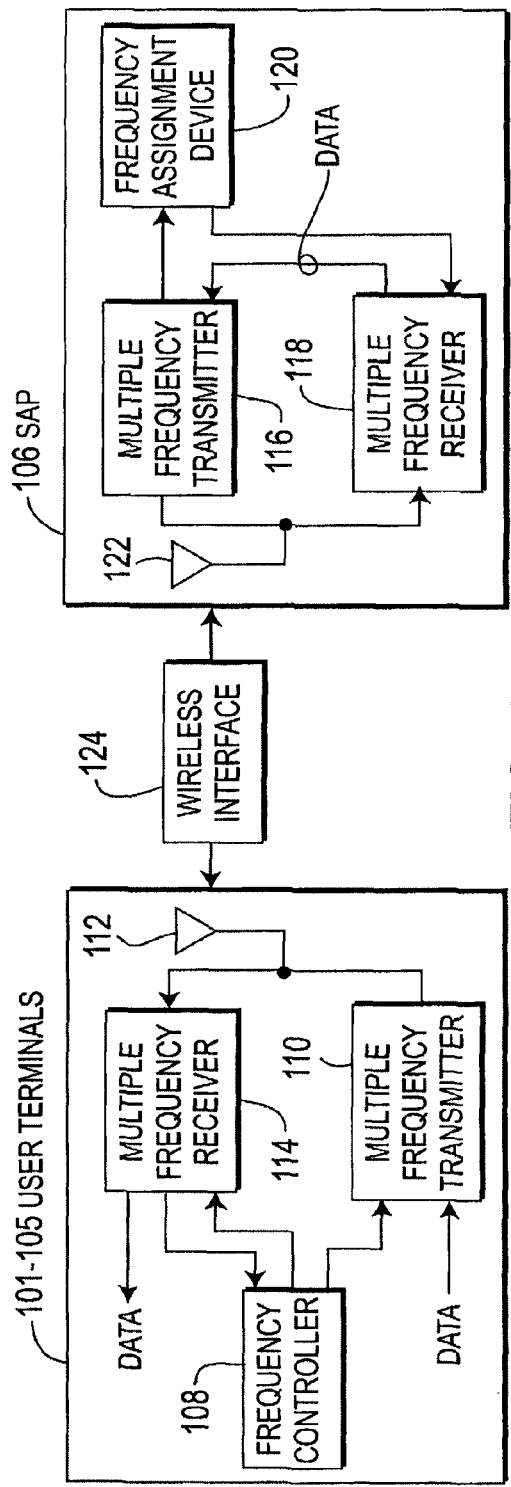
FIG. 1B shows a simplified diagram of a user terminal and a switching access point using frequency carrier Ethernet ports.

FIG. 1B is an illustration of a preferred user terminal and SAP using multiple frequencies. The SAP 106 has a frequency assignment device 120 for assigning frequencies (frequency ports) to the user terminals 101-105. A multiple frequency receiver 118 receives data sent by the terminals 101-105 using the assigned frequency port. A multiple frequency transmitter 116 sends data from one terminal to another using the assigned frequency of the destination terminal. The multiple frequency transmitter 116 preferably also transmits the frequency assignment to the terminals 101-105. An antenna 122 or antenna array is used to send and receive data by the SAP 106 over the wireless interface 124.

The terminals 101-105 have a multiple frequency receiver 114 for receiving the frequency assignment and recovers the transmitted data over the terminal's assigned frequency. A frequency controller 108 users the received assigned frequencies to control the transmission and reception frequencies of the terminal 101-105. A multiple frequency transmitter 110 transmits the data over the assigned frequency.

Figure 2A:
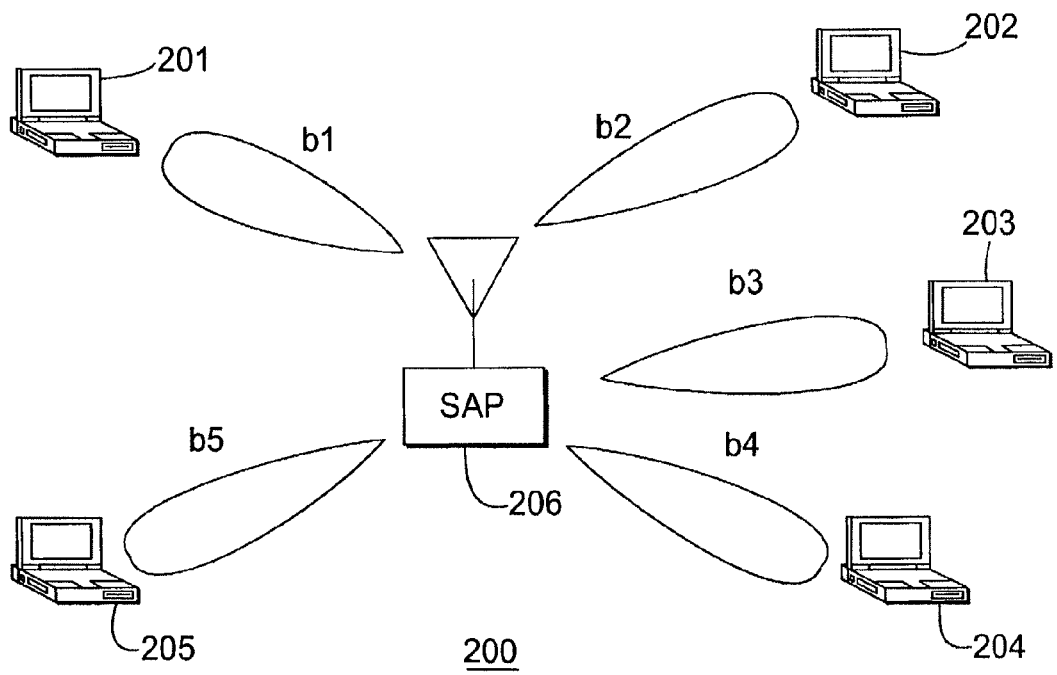
FIG. 2A shows a system diagram of a WLAN with spatial beam Ethernet ports.

FIG. 2A shows an alternative embodiment of wireless switching by assigning each user terminal 201-205 to a spatial port instead of a particular frequency. As shown in FIG. 2A, spatial beams b1-b5 are created by beam forming and can be used as ports to isolate user terminals 201-206 from each other. SAP 206 recognizes the destination address of each user terminal 201-205, and associates a beam to each address. SAP 206 is capable of receiving more than one beam at the same time.

Figure 2B:
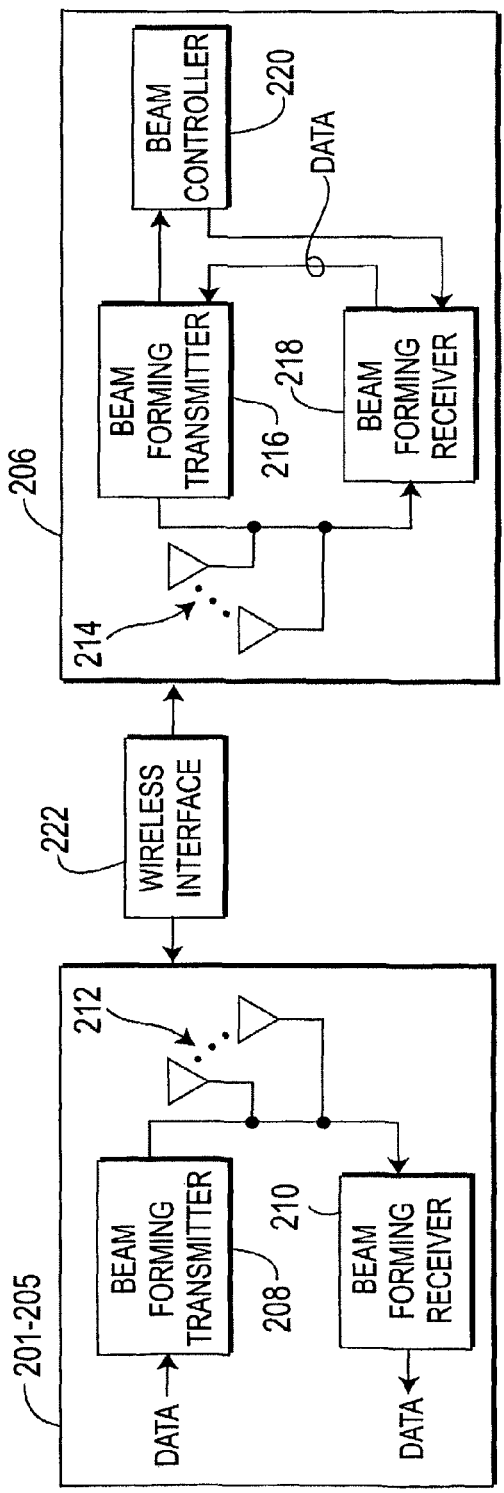
FIG. 2B shows a simplified diagram of a user terminal and a switching access point using spatial beam Ethernet ports.

FIG. 2B is an illustration of a preferred user terminal and SAP using spatial beams. The SAP 206 has a beam controller 220 for determining which beam (spatial port) is associated with a particular user. The controller 220 provides a beam forming transmitter 216 and a beam forming receiver 218 the beam information so that the appropriate spatial port is used for a given terminal. An antenna array 214 is used to send and receive data over the wireless interface 222.

The terminals 201-205 have a beam forming receiver 210 for receiving transmitted data using an antenna array 212. A beam forming transmitter 208 is used to transmit data to the SAP 206 using the array 212.

Although the system configurations of FIGS. 1A, 1B, 2A and 2B show five user terminals, any number of user terminals may be used. The intent is to demonstrate and not to limit or restrict the scope of the system capabilities. The wireless switching systems of FIGS. 1A and 2A can be used separately or combined. To illustrate, user terminals 101-105 can be distinguished by a combination of spatial beam and frequency. The wireless switching systems of FIGS. 1A and 2A can be applied to systems including, but not limited to, direct sequence (DS) WLAN and orthogonal frequency division multiplexing (OFDM) WLAN systems.

What is claimed is:

1. A wireless user terminal comprising:
a receiver and a controller configured to receive a plurality of orthogonal frequency division multiplexing (OFDM) signals on at least one downlink carrier frequency, wherein each of the plurality of OFDM signals includes carrier frequency assignment information indicating an uplink carrier frequency and spatial pattern information indicating an uplink spatial pattern to transmit uplink data; and
a transmitter and the controller configured to transmit a plurality of uplink signals each responsive to a respective OFDM signal of the plurality of OFDM signals, wherein each uplink signal is transmitted on the uplink carrier frequency and using the uplink spatial pattern indicated, respectively, in the carrier frequency assignment information and the spatial pattern information of the respective OFDM signal of the plurality of OFDM signals to which the uplink signal is responsive,
wherein the uplink carrier frequency indicated in the carrier frequency assignment information and the uplink spatial pattern indicated in the spatial pattern information dynamically change over the plurality of OFDM signals,
the controller is configured to dynamically change the uplink carrier frequency of the transmitter for transmitting the plurality of uplink signals according to the carrier frequency assignment information received over the plurality of OFDM signals, and
the controller is configured to dynamically change the uplink spatial pattern of the transmitter for transmitting the plurality of uplink signals according to the spatial pattern information received over the plurality of OFDM signals.

2. The wireless user terminal of claim 1, wherein the transmitter and the controller are further configured to transmit an indication that the wireless user terminal has data to transmit, and wherein a first OFDM signal of the plurality of OFDM signals is received in response to the indication.

3. The wireless user terminal of claim 1, wherein the receiver and controller are further configured to assign a carrier frequency to receive an OFDM signal.

4. The wireless user terminal of claim 1, wherein the receiver and the controller are further configured to receive the plurality of OFDM signals sequentially over time on a plurality of different downlink carrier frequencies.

5. The wireless user terminal of claim 1, wherein each uplink carrier frequency comprises a mutually non-overlapping band of sub-carriers.

6. The wireless user terminal of claim 1, wherein each uplink carrier frequency comprises a different set of a plurality of sub-carriers.

7. A method for use in a wireless user terminal, comprising:
receiving, by a receiver, a plurality of orthogonal frequency division multiplexing (OFDM) signals on at least one downlink carrier frequency, wherein each of the plurality of OFDM signals includes carrier frequency assignment information indicating an uplink carrier frequency and spatial pattern information indicating an uplink spatial pattern to transmit uplink data;
transmitting, by a transmitter, a plurality of uplink signals each responsive to a respective OFDM signal of the plurality of OFDM signals, wherein each uplink signal is transmitted on the uplink carrier frequency and using the uplink spatial pattern indicated, respectively, by the carrier frequency assignment information and the spatial pattern information of the respective OFDM signal of the plurality of OFDM signals to which the uplink signal is responsive,
wherein the uplink carrier frequency indicated in the carrier frequency assignment information and the uplink spatial pattern indicated in the spatial pattern information dynamically change over the plurality of OFDM signals;
dynamically changing, by a controller, the uplink carrier frequency of the transmitter for transmitting the plurality of uplink signals according to the carrier frequency assignment information received over the plurality of OFDM signals, and
dynamically changing the uplink spatial pattern of the transmitter for transmitting the plurality of uplink signals according to the spatial pattern information received over the plurality of OFDM signals.

8. The method of claim 7, further comprising:
transmitting an indication that the wireless user terminal has data to transmit; and
receiving a first OFDM signal of the plurality of OFDM signals in response to the indication.

9. The method of claim 7, further comprising:
assigning a carrier frequency to receive an OFDM signal.

10. The method of claim 7, further comprising:
receiving the plurality of OFDM signals sequentially over time on a plurality of different downlink carrier frequencies.

11. The method of claim 7, wherein each uplink carrier frequency comprises a mutually non-overlapping band of sub-carriers.

12. The method of claim 7, wherein each uplink carrier frequency comprises a different set of a plurality of sub-carriers.

13. An infrastructure device, comprising:
a transmitter configured to transmit a plurality of orthogonal frequency division multiplexing (OFDM) signals on at least one downlink carrier frequency, wherein each of the plurality of OFDM signals includes carrier frequency assignment information indicating an uplink carrier frequency and spatial pattern information indicating an uplink spatial pattern to receive uplink data;
a controller configured to dynamically change the uplink carrier frequency indicated in the carrier frequency assignment information over the plurality of OFDM signals, and dynamically change the uplink spatial pattern indicated in the spatial pattern information over the plurality of OFDM signals; and
a receiver configured to receive a plurality of uplink signals each responsive to a respective OFDM signal of the plurality of OFDM signals, wherein each uplink signal is received on the uplink carrier frequency and having the uplink spatial pattern indicated, respectively, by the carrier frequency assignment information and the spatial pattern information of the respective OFDM signal of the plurality of OFDM signals to which the uplink signal is responsive.

14. The infrastructure device of claim 13, wherein the receiver is further configured to receive an indication that a wireless user terminal has data to transmit, and wherein the transmitter is further configured to transmit a first OFDM signal of the plurality of OFDM signals in response to the indication.

15. The infrastructure device of claim 13, wherein the transmitter is further configured to transmit the plurality of OFDM signals sequentially over time on a plurality of different downlink carrier frequencies.

16. The infrastructure device of claim 13, wherein each uplink carrier frequency comprises a mutually non-overlapping band of sub-carriers.

17. The infrastructure device of claim 13, wherein each uplink carrier frequency comprises a different set of a plurality of sub-carriers.

* * * * *